Oct. 22, 1968 E. WIIK 3,406,502
BAGHOUSE APPARATUS
Filed May 2, 1967
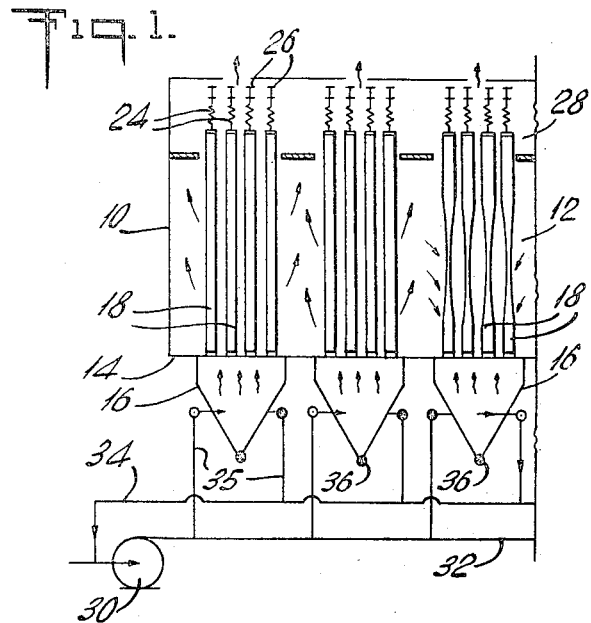
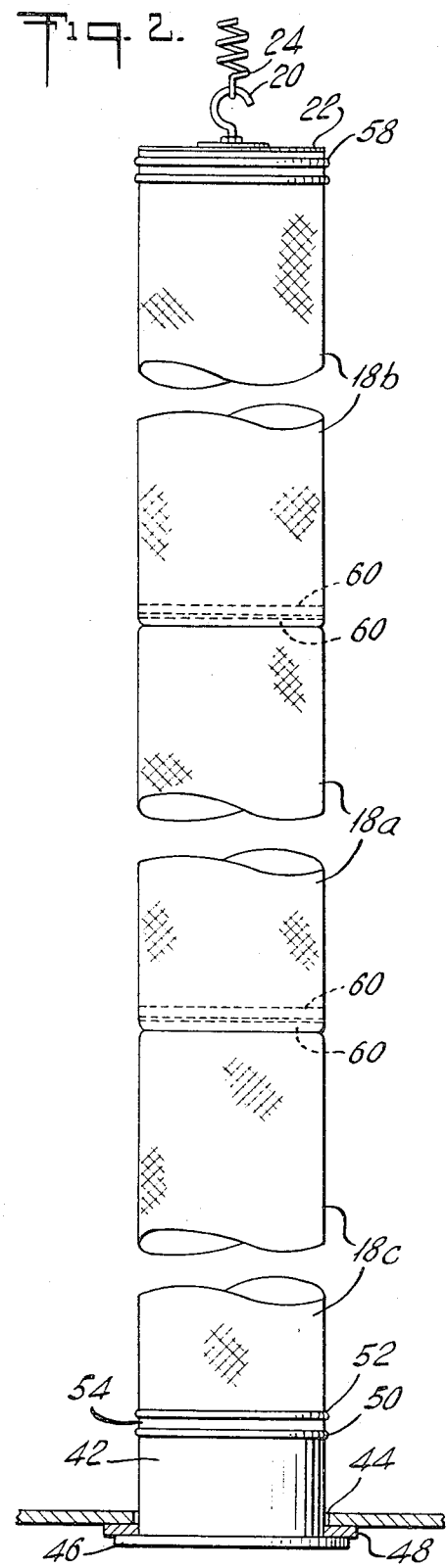
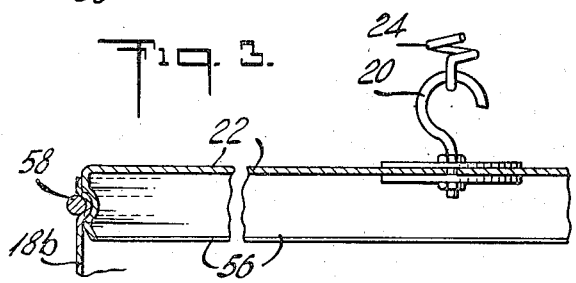
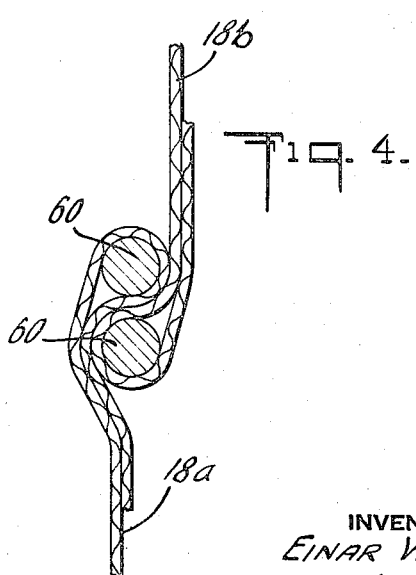
INVENTOR
EINAR WIIK
BY J. F. Moran
ATTORNEY United States Patent Office 3,406,502
Patented Oct. 22, 1968

3,406,502
BAGHOUSE APPARATUS
Einar Wiik, Los Angeles, Calif., assignor to Menardi & Company, Torrance, Calif., a corporation of California
Filed May 2, 1967, Ser. No. 635,555
4 Claims. (Cl. 55—341)

ABSTRACT OF THE DISCLOSURE

A baghouse for cleaning dust-laden gases in which vertically elongated tubular filter bags are each formed by a number of releasably connected vertically aligned sections which are individually replaceable when damaged from within the bag or filter chamber. The bag section connecting means also serve to oppose the collapse of the bags when the gas flow through the bags is reversed for cleaning purposes.

---

This invention relates to the construction and support of vertically elongated tubular filter bags formed of a gas-pervious dust-arresting flexible heat resistant fabric, such as silicone-treated fiberglass, adapted to be arranged in spaced relation in the filter chamber of a baghouse for filtering dust particles from a dust-laden gas flowing into one end of the bags from an adjacent dirty gas inlet chamber and outwardly through the peripheral walls of the bags, on the inner surface of which the separated dust accumulates in a cake.

In accordance with known practice and as disclosed in an application of Wade E. Ballard and Robert H. Walpole, Ser. No. 251,185, filed Jan. 14, 1963, now U.S. Patent 3,333,403, the bags are periodically cleaned in groups by a flowback of clean gas or air through the bags to break up and remove the accumulated dust cake from the inner surface of the bags, from which the dust drops through the lower end of the bags into a subjacent dust collecting hopper. With the reversed gas flow the major portion of each bag tends to collapse into an X-shaped cross-section which would choke-off the reverse gas flow to such an extent that the dust cannot fall freely during the cleaning cycle and may be re-entrained. To prevent such collapse of the bags, and yet permit sufficient flexing of the bags to break up the dust cake on the inside surface, each bag is provided with a series of vertically spaced internal metallic rings carried by an axial cable or rod and arranged to hold the bag in an uncollapsed position during the reverse gas flow cleaning cycle.

The use of anti-collapse bag-holding rings has been recognized as resulting in substantially lower pressure drop through the bags, longer bag life, and more effective cleaning. In an effort to eliminate the labor required to separately install such bag-holding ring assemblies, metal rings have been sewn into the bags at vertically spaced locations. This is feasible with small diameter bags, for example, 6" O.D., but considered impracticable in the large diameter and long bags normally used. Such bags are usually on the order of thirty feet in length and twelve to eighteen inches in diameter, for example, and are relatively expensive.

It is essential for effective gas cleaning that the filter bags be maintained intact while in use. In the event a bag is holed by abrasion, mechanical action or chemical attack, it must be replaced. Even a relatively small hole in a thirty-foot fiberglass bag may require replacement and discarding of the entire bag. Since the bag lengths and diameters vary considerably in different installations, the bags are usually manufactured to order, requiring the maintenance of a substantial bag inventory at the place of use to avoid delays in replacement.

In a companion application of Wade E. Ballard, Ser. No. 635,608, filed May 2, 1967, is disclosed a filter bag construction which permits the simultaneous installation of the bags and bagholding ring means by constructing the bag in a number of releasably connected vertically aligned sections which are individually replaceable when damaged from within the bag or filter chamber. The bag sections are releasably connected by separate metallic couplings into which snap rings sewn into the bag section ends fit.

The general object of my invention is the provision of a sectional filter bag construction of the general character disclosed in said copending Ballard application with improved means for releasably connecting the bag sections, and, more particularly, bag section connecting means which are integral with the bag sections while simultaneously functioning to oppose collapse of the bag when undergoing a bag cleaning operation.

The various features of novelty which characterize the invention are pointed out with particularity in the claims annexed to and forming a part of this specification. For an understanding of the invention, its operating advantages and specific objects attained by its use, reference should be had to the accompanying drawings and descriptive matter in which there is illustrated and described a preferred embodiment of the invention.

Of the drawings:

FIG. 1 is a diagrammatic sectional elevation of a conventional baghouse showing two groups of bags in normal filtering operation and a third group of bags undergoing cleaning;

FIG. 2 is a broken elevation partly in section of a filter bag constructed in accordance with the invention;

FIG. 3 is a fragmentary sectional view of the bag top and closure cap; and

FIG. 4 is an enlarged sectional elevation of one pair of connected bag section ends.

In the drawings, FIG. 1 illustrates one type of baghouse in which filter bags of my invention are adapted for use. The baghouse 10 has a filter chamber 12, the bottom of which is defined by a horizontal tube sheet 14 opening to a series of subjacent gas-tight hoppers 16 arranged to sequentially receive the dust collected by spaced groups of flexible filter bags 18 of the character described arranged in the filter chamber. The bags are supported under tension by hooks 20 connected to metal caps 22 releasably closing the upper ends of the bags and coiled tension springs 24 depending from stationary supports 26 arranged in a plenum chamber 28 above the filter chamber 12. The hoppers 16 are connected in parallel to a fan 30 through supply and return ducts 32 and 34 respectively, and valved branch connections 35 operable to maintain either a positive pressure or suction in the individual hoppers 16. A sealed screw feeder 36 is arranged in the bottom of each hopper to remove the deposited dust. As indicated by the arrows in FIG. 1, the first two groups of bags can receive dust-laden gas at their lower ends from the fan 30 and subjacent hoppers 16, the gas flowing upwardly in and outwardly through the bags, while the third group of bags will be undergoing a cleaning cycle in which clean gas is drawn inwardly and downwardly through the bags from the filter chamber 12 by the suction created by closing the branch connection from the duct 32 and opening the branch connection to the return duct 34 which is connected to the dirty gas inlet side of the fan 30. The corresponding screw feeder 36 is simultaneously operated to remove the dust accumulating in the hopper. This general arrangement and mode of operation are well known to those skilled in the art.

As shown in FIGS. 2–4, each bag is composed of one or more vertically aligned intermediate sections 18ª of a predetermined standard length and diameter and shorter upper and lower end sections 18$^b$ and 18$^c$ releasably connected thereto. For example, the intermediate sections may be six feet in length and each end section approximately three feet. A thirty-foot bag could thus be formed by four such intermediate sections and two end sections, any one of which can be readily replaced while the bag is in position by unhooking the bag from the corresponding tension spring, disconnecting the damaged section, and substituting a corresponding undamaged section. A substantial reduction in the inventory of spare bag sections for each baghouse is thus permissible.

As shown in FIG. 2, each bag is connected to a lower thimble 42 positioned in and projecting upwardly from a corresponding opening 44 in the lower tube plate 14. A circumferential flange 46 and gas sealing gasket 48 limit the upward movement of the thimble in the tube plate. A flexible bead 50 on the lower end of the bag section 18$^c$ fits over a bead 52 on the upper end of the thimble and the overlapping parts secured by a circumferential clamp 54 in a well known way.

Similarly, as shown in FIG. 3, the beaded upper end of the top bag section 18$^b$ fits over an internally beaded circumferential flange 56 depending from the closure cap 22 and is releasably secured thereto by a circular clamp 58.

The intermediate sections 18$^a$ are detachably connected to one another and to the free ends of bag sections 18$^b$ and 18$^c$ by providing each bag end to be connected with a sewn-in metallic ring 60, preferably a one-piece continuous solid or tubular circular cross-section rod of resiliently flexible stainless steel. All of the rings are of the same size and sewn into bags with the bag end within the corresponding ring. By turning the rings so that their axes are relatively perpendicular and deforming one of the rings into an oval formation, the deformed ring can be passed through the other ring. The inner ring is then turned so that its axis is coincidental with the axis of the other ring and allowed to expand to its original circular form. As shown in FIG. 4, when the connected bag sections are tensioned, the fabric-covered rings 60 will be locked into position, preventing separation of the bag sections until the tension is relaxed and the foregoing steps are reversed. As illustrated, when the ring in the upper end of the lower bag section is so deformed and inserted, it will be in vertical alignment with the ring in the lower end of the superjacent bag section and separated therefrom by two layers of fabric. The ring at the lower end of the lower bag section is preferably similarly deformed and inserted into the ring at the upper end of the subjacent bag section to provide a minimum change in diameter and vertical alignment of the bag filter surface throughout its length. A simple and inexpensive connection between the coaxial bag sections is thus provided, with a minimum amount of labor required to connect or disconnect the bag sections.

When such a sectional bag construction is subjected to a gas flow inwardly through the bag wall as occurs in the periodic cleaning cycles, the vertically spaced pairs of rings 60 cooperate in opposing collapse of the bags and thus obstructing the cleaning operation.

What is claimed is:

1. In a baghouse for cleaning a dust-laden gas, a filter chamber having a lower apertured tube plate, a group of vertically elongated tubular filter bags of gas-pervious dust-arresting fabric, thimbles positioned in said tube plate apertures, means for releasably connecting the lower end of each bag to a corresponding thimble, means for applying a tension to the upper end of each bag, said bag being formed in a pair of end sections and a plurality of separate axially aligned individually replaceable intermediate sections, and means for releaseably connecting the adjacent intermediate bag sections to one another and to said end sections and opposing the collapse of said bag on a gas flow inwardly therethrough, the improvement which comprises said connecting means consisting of similarly sized rings sewn in the ends of the connected bag sections and arranged in an interlocking position maintained by said tension means.

2. The combination according to claim 1 in which at least one of the sewn-in rings is of one-piece flexible metal and sufficiently deformable to pass through the ring of the other bag section and expandable into abutting engagement with the diametrically opposite portion of the second ring.

3. The combination according to claim 2 in which each ring is sewn into an outwardly cuffed end of a bag section to provide two layers of fabric between the rings when in their interlocked position.

4. The combination according to claim 2 in which the sewn-in rings are one-piece solid bars of resiliently flexible stainless steel.

References Cited

UNITED STATES PATENTS

| | | | |
|---|---|---|---|
| 720,084 | 2/1903 | Thurman | 55—381 |
| 1,833,904 | 12/1931 | Keys | 55—366 |
| 2,079,315 | 5/1937 | Dickerson | 55—293 |
| 2,129,105 | 9/1938 | Spence | 285—260 |
| 2,357,943 | 9/1944 | Feagley et al. | 210—323 |
| 3,243,940 | 4/1966 | Larson | 55—379 |
| 3,333,403 | 8/1967 | Ballard et al. | 55—501 |
| 2,935,158 | 5/1960 | Braun | 55—377 |
| 1,163,318 | 12/1915 | Bryant | 55—293 |

FOREIGN PATENTS 704,629   4/1941   Germany.

OTHER REFERENCES

Bag House Dust Collectors, Bulletin BH–10, A.S.H Industries Inc., May 4, 1966, four pages.

HARRY B. THORNTON, *Primary Examiner.*

B. NOZICK, *Assistant Examiner.*